United States Patent
Lee (10) Patent No.: US 11,120,356 B2
(45) Date of Patent: *Sep. 14, 2021

(54) MORPHING FEDERATED MODEL FOR REAL-TIME PREVENTION OF RESOURCE ABUSE

(71) Applicant: BANK OF AMERICA CORPORATION, Charlotte, NC (US)

(72) Inventor: Jisoo Lee, Chesterfield, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1217 days.

This patent is subject to a terminal disclaimer.

(21) Appl. No.: 15/461,652

(22) Filed: Mar. 17, 2017

(65) Prior Publication Data

US 2018/0268314 A1 Sep. 20, 2018

(51) Int. Cl.
| | |
|---|---|
| *G06N 10/00* | (2019.01) |
| *G06F 21/62* | (2013.01) |
| *G06F 21/57* | (2013.01) |
| *G06F 21/55* | (2013.01) |

(Continued)

(52) U.S. Cl.
CPC ........... *G06N 10/00* (2019.01); *G06F 21/554* (2013.01); *G06F 21/57* (2013.01); *G06F 21/6245* (2013.01); *G06N 5/003* (2013.01); *G06Q 30/0201* (2013.01); *G06F 2221/2101* (2013.01)

(58) Field of Classification Search
CPC ........ G06N 10/00; G06N 5/003; G06N 20/00; G06N 20/10; G06N 20/20; G06F 21/57; G06F 21/554; G06F 21/6245; G06F 2221/2101; G06Q 30/0201
See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,533,068 B2 | 5/2009 | Maassen van den Brink et al. |

(Continued)

FOREIGN PATENT DOCUMENTS

| | | |
|---|---|---|
| AU | 2010249233 A1 | 6/2011 |
| CA | 2886849 A1 | 10/2016 |

(Continued)

*Primary Examiner* — Shane D Woolwine
(74) *Attorney, Agent, or Firm* — Michael A. Springs; Moore & Van Allen PLLC; Jeffrey R. Gray (57) ABSTRACT

Systems, computer products, and methods are described herein for improvements for identifying if an interaction between a user and an entity have been misappropriated. Instead of analyzing each interaction as the interactions are entered into between various users and the associated entities, a specific federated user model may be created for each user in order to predict the likelihood that interactions of the user may be misappropriated. In order to create the federated user model, a quantum optimizer may assign qubits to various inputs and analyze the inputs to create a federated user model that best predicts the user's interactions that may be misappropriated. As the inputs change, the quantum optimizer may be used to morph the federated user model in order to improve upon the ability of the specific federated user model in determining the likelihood that the user's interactions are misappropriated.

18 Claims, 5 Drawing Sheets

(51) Int. Cl.
*G06Q 30/02* (2012.01)
*G06N 5/00* (2006.01)

(56) References Cited

U.S. PATENT DOCUMENTS

| | | | |
|---|---|---|---|
| 7,619,437 | B2 | 11/2009 | Thom et al. |
| 7,639,035 | B2 | 12/2009 | Berkley |
| 7,898,282 | B2 | 3/2011 | Harris et al. |
| 8,008,942 | B2 | 8/2011 | van den Brink et al. |
| 8,190,548 | B2 | 5/2012 | Choi |
| 8,195,596 | B2 | 6/2012 | Rose et al. |
| 8,283,943 | B2 | 10/2012 | van den Brink et al. |
| 8,421,053 | B2 | 4/2013 | Bunyk et al. |
| 8,744,075 | B2 | 6/2014 | Tanaka |
| 8,897,449 | B1 | 11/2014 | Broadbent |
| 9,207,672 | B2 | 12/2015 | Williams et al. |
| 9,246,675 | B2 | 1/2016 | Ding |
| 9,400,499 | B2 | 7/2016 | Williams et al. |
| 9,537,660 | B2 | 1/2017 | Wang et al. |
| 10,440,052 | B2 * | 10/2019 | Lee ................ H04L 63/1466 |
| 2004/0139000 | A1 | 7/2004 | Amos |
| 2005/0010508 | A1 | 1/2005 | Groz |
| 2006/0088157 | A1 | 4/2006 | Fujii |
| 2006/0251247 | A1 | 11/2006 | Akiyama et al. |
| 2007/0239366 | A1 * | 10/2007 | Hilton ................ B82Y 10/00 |
| | | | 702/27 |
| 2011/0004580 | A1 * | 1/2011 | Varghese ............ G06N 20/00 |
| | | | 706/47 |
| 2012/0002008 | A1 | 1/2012 | Valin et al. |
| 2013/0117200 | A1 | 5/2013 | Thom |
| 2014/0068765 | A1 * | 3/2014 | Choi ................ H04L 63/1416 |
| | | | 726/23 |
| 2014/0297247 | A1 * | 10/2014 | Troyer ................ G06F 30/20 |
| | | | 703/21 |
| 2017/0177534 | A1 * | 6/2017 | Mohseni ............ H01L 39/025 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

```
┌─────────────────────────────────────────────────────────────────────────┐
│                   IDENTIFY RECENT INTERACTIONS OF A USER                │
│                                   410                                   │
└─────────────────────────────────────────────────────────────────────────┘
                                    ▼
┌─────────────────────────────────────────────────────────────────────────┐
│                    IDENTIFY PAST INTERACTIONS OF THE USER               │
│                                   420                                   │
└─────────────────────────────────────────────────────────────────────────┘
                                    ▼
┌─────────────────────────────────────────────────────────────────────────┐
│ IDENTIFY ENTITY DATA (E.G., MISAPPROPRIATED INTERACTION DATA FROM ENTITIES, ENTITY PROFILE DATA, OR │
│    THE LIKE) FOR VARIOUS ENTITIES (E.G., THIRD-PARTY PARTNERS, MERCHANTS, OR THE LIKE)              │
│                                   430                                   │
└─────────────────────────────────────────────────────────────────────────┘
                                    ▼
┌─────────────────────────────────────────────────────────────────────────┐
│   IDENTIFY USER DATA (OTHER THAN USER INTERACTION DATA) FOR THE USER (E.G., USER PROFILE DATA,     │
│        LOCATION DATA, OR THE LIKE) AND IDENTIFY OTHER USER DATA FOR OTHER USERS                    │
│                                   440                                   │
└─────────────────────────────────────────────────────────────────────────┘
                                    ▼
┌─────────────────────────────────────────────────────────────────────────┐
│ ANALYZE THE RECENT INTERACTIONS, THE HISTORICAL INTERACTIONS, THE ENTITY DATA, USER DATA, OTHER    │
│  USER DATA, USING A QUANTUM COMPUTER TO CREATE A FEDERATED MODEL FOR IDENTIFYING POTENTIAL         │
│                    FUTURE MISAPPROPRIATED INTERACTIONS OF THE USER                                 │
│                                   450                                   │
└─────────────────────────────────────────────────────────────────────────┘
                                    ▼
┌─────────────────────────────────────────────────────────────────────────┐
│ UTILIZE THE FEDERATED MODEL FOR IDENTIFYING POTENTIAL MISAPPROPRIATED INTERACTIONS IN REAL-TIME    │
│                       AS THE USER ENTERS INTO NEW INTERACTIONS                                     │
│                                   460                                   │
└─────────────────────────────────────────────────────────────────────────┘
                                    ▼
┌─────────────────────────────────────────────────────────────────────────┐
│ UTILIZE THE QUANTUM OPTIMIZER TO MORPH THE FEDERATED MODEL BASED ON THE NEW INTERACTIONS, A        │
│  CHANGE IN THE USER DATA, THE ENTITY DATA, OTHER USER DATA, OR THE LIKE (E.G., CHANGES IN THE      │
│              MISAPPROPRIATED INTERACTION DATA FROM OTHER ENTITIES, OR THE LIKE)                    │
│                                   470                                   │
└─────────────────────────────────────────────────────────────────────────┘
                                    ▼
┌─────────────────────────────────────────────────────────────────────────┐
│ UTILIZE THE MORPHED FEDERATED MODEL FOR IDENTIFYING POTENTIAL MISAPPROPRIATED INTERACTIONS IN      │
│           REAL-TIME AS THE USER ENTERS INTO ADDITIONAL NEW INTERACTIONS                            │
│                                   480                                   │
└─────────────────────────────────────────────────────────────────────────┘
```

MORPHING FEDERATED MODEL FOR REAL-TIME PREVENTION OF RESOURCE ABUSE

FIELD

The present invention relates to utilizing a quantum optimizer to improve identification of misappropriated data.

BACKGROUND

Identifying a breach that resulted in misappropriated data or a breach location of the misappropriated data includes capturing large amounts of data for various interactions. Investigating the large amounts of data may be difficult because all of the various inputs that are available to use in order to determine the potential breach that resulted in misappropriated data. Improved systems are needed in order to provide more accurate identification of a breach that resulted in misappropriated data and/or the location of such breach.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improvements for identifying if an interaction between a user and an entity has been misappropriated. In one embodiment of the invention, a classical computer may be utilized to analyze data inputs related to a particular interaction and determine if the interaction is potentially misappropriated based on a trigger activated by one or more of the inputs. If the classical computer identifies that the interaction is potentially misappropriated, then the inputs may be provided to a quantum optimizer to analyze inputs in greater depth in order to provide a more in depth analysis of the interaction. Alternatively, just the quantum optimizer (and not the classical computer) may be utilized to analyze the inputs and determine if the interaction is potentially misappropriated. Because the quantum optimizer is able to analyze more inputs than a classical computer it can provide a more accurate analysis of the interaction. For example, the quantum optimizer assigns qubits to the inputs and analyzes the inputs to determine if the potentially misappropriated interaction is likely misappropriated or not. Moreover, when it is verified that an interaction is a misappropriated interaction (e.g., the quantum computer identifies it as likely misappropriated, and/or the user or organization may confirm that it is a misappropriated interaction, or the like), then the quantum optimizer can also re-analyze past interactions of the user and other inputs, in view of the verified misappropriated interaction in order to determine a breach point (e.g., breach time and location) at which the original breach occurred that led to the misappropriated interaction. The model used to determine if an interaction is potentially misappropriated may also be modified when an interaction is determined to be verified.

In other embodiments of the invention, instead of analyzing each interaction as the interactions are entered into between the user and the associated entity, a specific federated user model may be created for each user in order to predict the likelihood that interactions of the user may be misappropriated. In order to create the federated user model, a quantum optimizer may assign qubits to various inputs (e.g., past user interactions, user data, such as specific user data and other user data, entity data for various entities, or the like) and analyze the inputs to create a federated user model that best predicts (e.g., provides the greatest confidence, such that provides the greatest confidence score) the user's interactions that may be misappropriated. In this way, the quantum optimizer may run the inputs through various known models or develop models, in order to identify the most relevant model and/or develop an intricate model for the future predictions for the user interactions. In some embodiments, the quantum optimizer may further develop a simple model that approximates a more detailed intricate model, which a classical computer may utilize to approximate the results of the intricate model developed by the quantum computer. As such, a classical computer my utilize the specific intricate federated user model and/or the approximated federated user model to analyze the user's current and/or future interactions in order to determine the likelihood that such interactions have been misappropriated. As the inputs change (e.g., misappropriated interactions are identified for the user, other users, and/or other entities), the quantum optimizer may be used to morph (e.g., modify, or the like) the federated user model in order to improve upon the ability of the specific federated user model in determining the likelihood that the user's interactions are misappropriated. In one embodiment of the invention, regardless of the type of model used to determine if the interaction is misappropriated, the model may analyze interactions and an interaction is determined to be acceptable or not based on a whether or not a threshold level is met when the model analyzes the interaction.

As such, the present invention solves a technical problem that only occurs in technological environments in that it provides various embodiments to more efficiently and accurately analyze interactions between users and entities through the use of a quantum computer. In other embodiments, the efficiency of the analysis may be improved through the use of a classical computer in combination with a quantum computer, such that the quantum computer is not needed to analyze each interaction, which could be costly and time consuming. For example, the present invention may identify potentially misappropriated interactions using one or more classical computers, and only analyze the interactions that have been identified as potentially misappropriated with the quantum computer to provide a more accurate determination if the interaction is misappropriated. In other embodiments, the present invention uses a quantum computer to create a federated user model specific to a particular user (e.g., optimized known model intricate model, an approximation of the intricate model, and/or the like), and thereafter uses the quantum computer or allows a classical computer to use the federated user model each time the user enters into an interaction in order to determine the likelihood that the user's interactions are misappropriated.

Embodiments of the invention comprise systems, method, and computer program products for creating a federated user model for predicting misappropriated interactions. The invention comprises one or more quantum optimizers comprising one or more quantum processors, and one or more quantum memory devices. The one or more quantum processors are configured to receive interaction data for a plurality of past interactions, user data, and entity data from a plurality of entities that have a relationship with a user, wherein the interaction data, the user data, and the entity data are inputs for the one or more quantum optimizers. The one or more quantum processors are further configured to assign qubits to the inputs, analyze the inputs to determine the federated user model for predicting future misappropriated interactions of the user, and wherein the federated user model is utilized to determine when a new interaction the user is entering is potentially misappropriated.

In further accord with embodiments of the invention, wherein the one or more quantum processors are configured to utilize the federated user model to determine when the new interaction of the user is potentially misappropriated, provide an indication that the new interaction should be allowed when the federated user model indicates that the new interaction is acceptable, and provide an indication that the new interaction should be prevented when the federated user model indicates that the new interaction is misappropriated.

In other embodiments of the invention, the past interactions comprise recent interactions and historical interactions.

In yet other embodiments of the invention, the new interaction is included in the inputs as a new input, and wherein the one or more quantum optimizers are configured to modify the federated user model based on the new input.

In still other embodiments of the invention, the inputs change and wherein the one or more quantum optimizers are configured to modify the federated user model based on a changed input.

In further accord with embodiments of the invention, the federated user model is based on a model from a set of known models that provides a greatest confidence when predicting past misappropriated interactions.

In other embodiments of the invention, the federated user model is a simple model that approximates an intricate model developed by the one or more quantum optimizers, and wherein the one or more classical computers run the simple model more efficiently compared to the intricate model.

In yet other embodiments, the invention further comprises one or more classical computers comprising one or more memory devices having computer readable code store thereon, and one or more processing devices operatively coupled to the one or more memory devices. The one or more processing devices are configured to execute the computer readable code to receive the new interaction of the user, utilize the federated user model for determining when the new interaction is allowable or when the new interaction should be prevented, allow the new interaction when the federated user model indicates that the new interaction should be allowed, and prevent the new interaction when the federated user model indicates that the new interaction should be prevented.

In still other embodiments, the invention further comprises one or more classical computers comprising one or more memory devices having computer readable code store thereon, and one or more processing devices operatively coupled to the one or more memory devices. The one or more processing devices are configured to execute the computer readable code to identify the plurality of past interactions of the user with the plurality of entities, identify the interaction data for the plurality of past interactions between the user and the plurality of entities, identify the user data, identify the entity data, and provide the interaction data for the plurality of past interactions, the user data, and the entity data to the one or more quantum optimizers.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving security of data and confidence that data has not been misappropriated. In particular, the present invention may be utilized to improve security of resources and confidence that the resources have not be misappropriated. In particular, the invention may be utilized to detect anomalies in the utilization of resources in real time and the likelihood that such anomalies are misappropriated resources. Moreover, the invention may be further utilized to retroactively identify the breach point that lead to the misappropriated resources.

Figure 1:
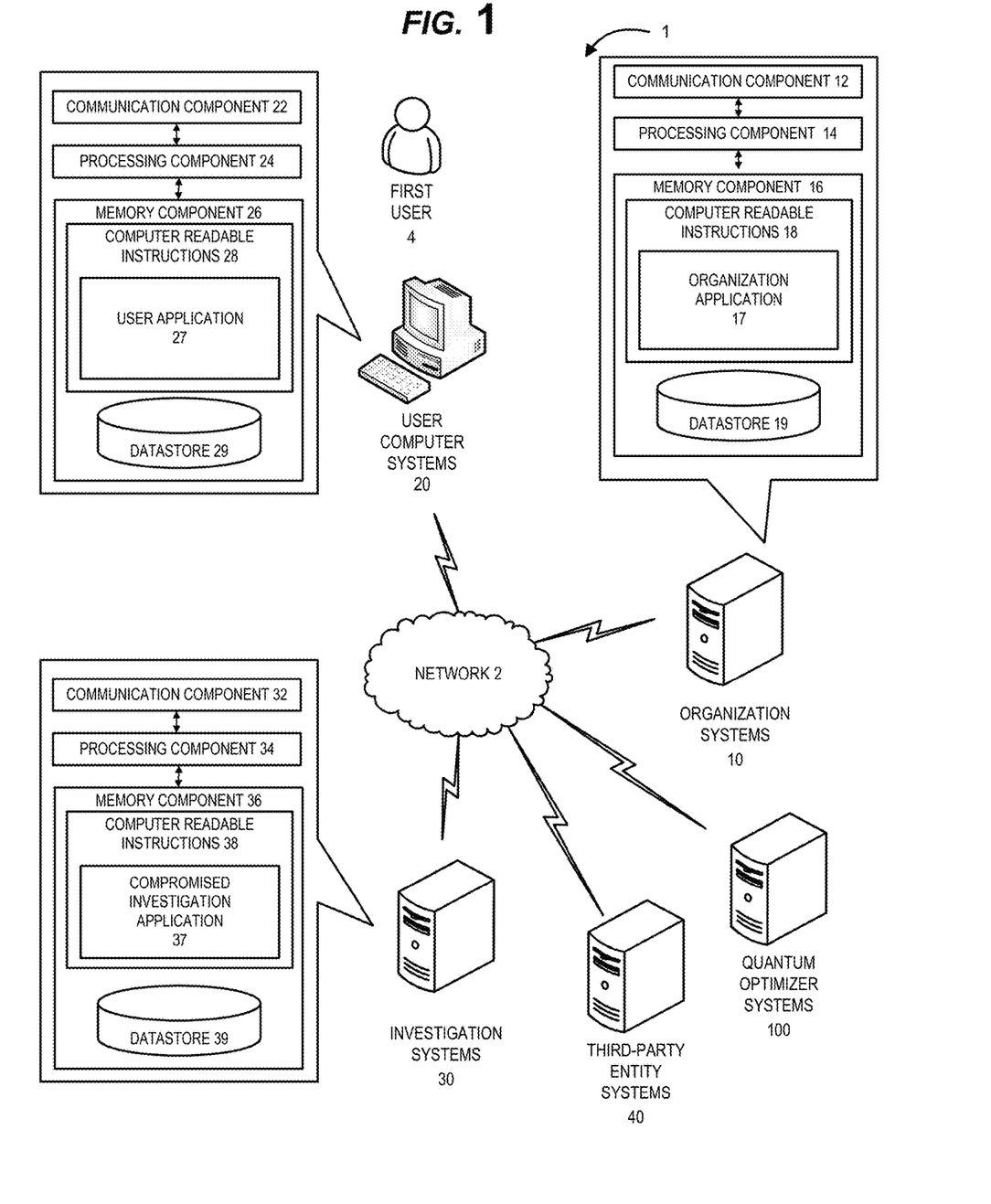
FIG. 1 illustrates a block system diagram of a data breach investigation system environment, in accordance with embodiments of the invention.

FIG. 1 illustrates a data breach investigation system environment 1, in accordance with embodiments of the invention. As illustrated in FIG. 1, one or more organization systems 10 are operatively coupled, via a network 2, to one or more user computer systems 20, one or more investigation systems 30, one or more third-party systems 40, one or more quantum optimizer systems 100, and/or one or more other systems (not illustrated). In this way, the organization systems 10 may track the interactions of the user 4 (e.g., one or more associates, employees, agents, contractors, subcontractors, third-party representatives, customers, or the like) with various entities in order to allow the investigation systems 30 to monitor interactions for potential misappropriated data, such as misappropriated resources of the user 4, and to allow the quantum optimizer systems 100 to more accurately identified such potential misappropriated data (e.g., misappropriated data), as will be discussed in further detail herein.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the investigation systems 30, the third-party systems 40, the quantum optimizer systems 100, and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of the organization application 17. In some embodiments, the one or more memory components 16 include one or more data stores 19 for storing data related to the organization systems 10, including, but not limited to, data created, accessed, and/or used by the organization application 17. In some aspects of the invention the organization application 17 is utilized to track the user's interactions, for example the user's interactions with various entities (e.g., the organization, third-party entities, or the like), and to capture data associated with the interactions, as will be discussed in further detail herein.

As illustrated in FIG. 1, users 4 may access the organization application 17, or other applications, through a user computer system 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the organization systems 10, the investigation systems 30, the third-party systems 40, the quantum optimizer systems 100, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow access to applications located on other systems, or the like. The user application 27 in some embodiments comprises an application that allows the user to enter into interactions with other entities, and in some embodiments allows for the transfer of resources between the user systems 20 and the systems of other entities.

As illustrated in FIG. 1, one or more investigation systems 30 (e.g., breach or misappropriation investigation systems, or the like) may be utilized by or through the organization systems 10 to analyze the user's interactions. As such, the investigation systems 30 are operatively coupled, via a network 2, to the one or more organization systems 10, the user computer systems 20, the third-party systems 40, the quantum optimizer systems 100, and/or other systems. The investigation systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of organization systems 10, the user computer systems 20, the third-party systems 40, the quantum optimizer systems 100, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the investigation systems 30 may have computer-readable instructions 38 stored in the one or more memory components 36, which in one embodiment includes the computer-readable instructions 38 of investigation applications 37 that allow the organization (or another third-party entity) to monitor the interactions of the user 4 and determine potential misappropriated data, such as potential misappropriated resources of the user 4, and/or to determine if the data requires further investigation using the quantum optimizer systems 100, as will be described further herein.

Moreover, as illustrated in FIG. 1, the third-party systems 40 and/or the other like systems are operatively coupled to the organization systems 10, the user computer systems 20, and/or the investigation systems 30, through the network 2. The third-party systems 40 and/or other like systems have components the same as or similar to the components described with respect to the organization systems 10, the user computer systems 20, and/or the investigation systems 30 (e.g., one or more communication components, one or more processing components, and one or more memory devices with computer-readable instructions of one or more applications, one or more datastores, or the like). Thus, the third-party systems 40 and/or other like systems communicate with the organization systems 10, the user computer systems 20, the investigation systems 30, and/or each other in same or similar way as previously described with respect to the organization systems 10, the user computer systems 20, and/or the investigation systems 30.

The third-party systems 40 (e.g., third party entity systems) are the systems of various entities with which the user 4 has interactions regarding data, such as resource interactions. It should be understood that the third-party systems 40 and the entities associated therewith may relate to any industry and may capture and provide information related to the user's location, habits, information, purchases, interests, social networking, resources allocation, or the like. As such, the third-party entities may store the data and/or may provide data to the organization systems 10, the investigation systems 30, and/or other like systems for analyzing the data. For example, the interaction data, user data, and/or entity data may be stored and/or provided by third party entities to allow the organization application 18, the investigation application 37, and other the quantum optimizer systems 100 to identify potential misappropriated data and breach information, as will be described herein.

Alternatively, or in addition to, utilizing the investigation application 37 to identify potential misappropriated data, the quantum optimizer systems 100 may be utilized by the organization systems 10 to perform various functions. For example, the quantum optimizer systems 100 may be utilized once a trigger is (or is not) reached with respect to the ability of the investigation application 37 to identify the potential misappropriated data. In another example, the quantum optimizer systems 100 may be utilized to identify a best model (e.g., greatest confidence) for the misappropriation investigation application 37 to utilize when determining potential misappropriated data. The various ways of utilizing the quantum optimizer systems 100 will be discussed in further detail herein, after discussing the quantum optimizer systems 100 in general.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for computers. Instead, quantum computers can outperform classical computers in a specialized set of computational problems. Principally, quantum computers have demonstrated superiority in solving optimization problems. Generally speaking, the term "optimization problem" as used herein describes a problem of finding the best solution (e.g., greatest confidence) from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

Figure 2:
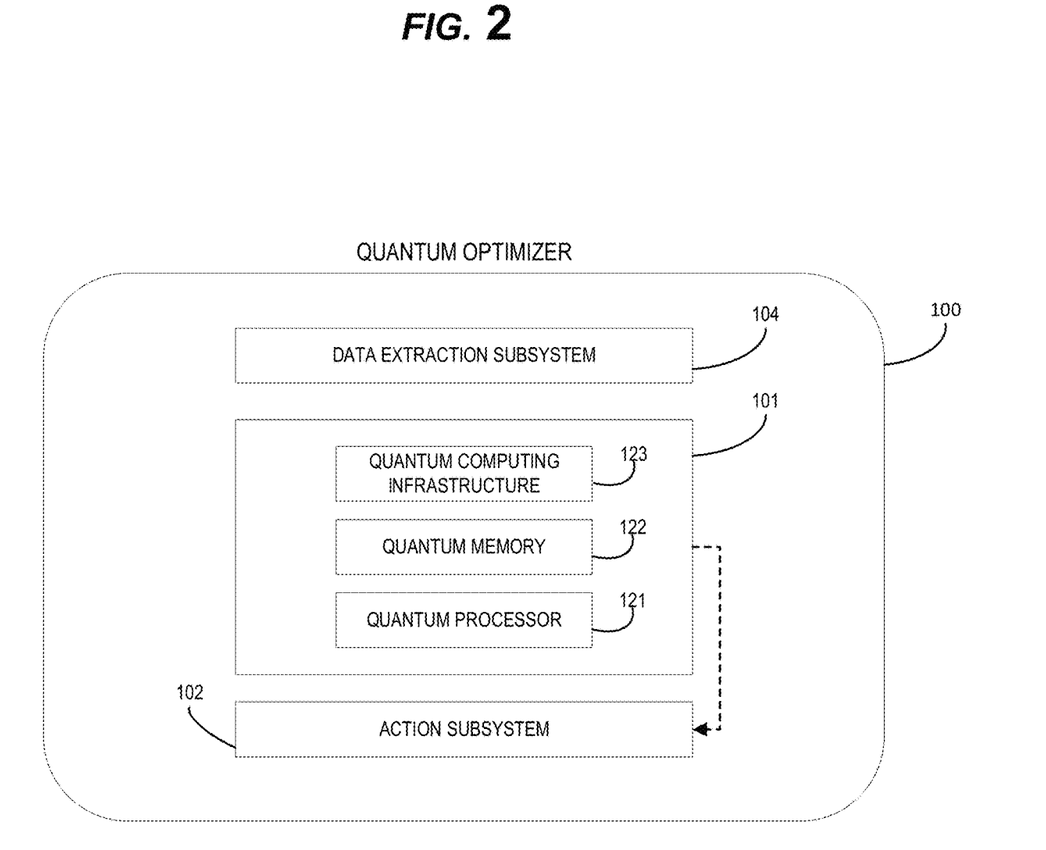
FIG. 2 illustrates a block diagram of a quantum optimizer used to analyze interactions of a user to determine if data has been misappropriated, in accordance with embodiments of the invention.
Figure 3:
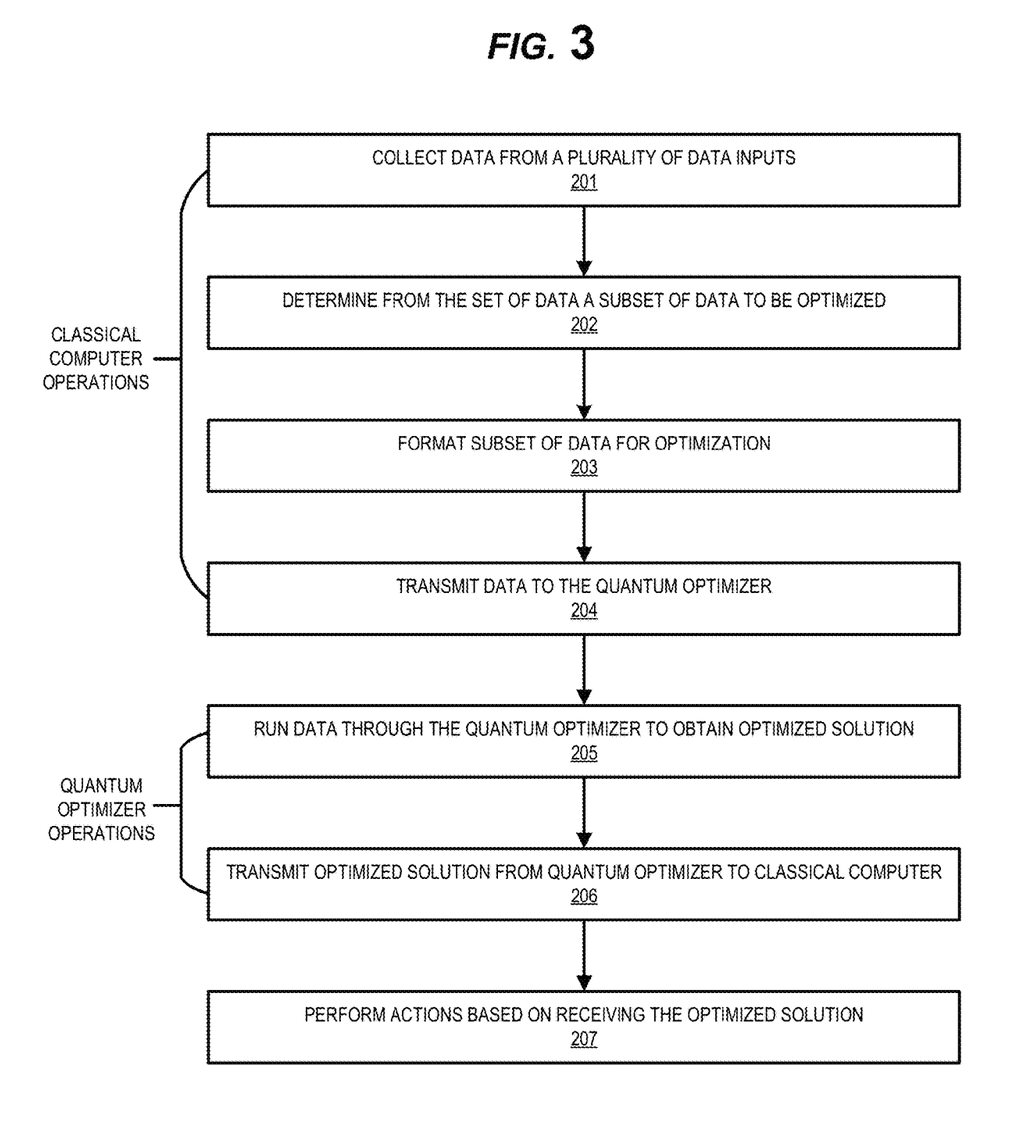
FIG. 3 illustrates a process flow regarding how the quantum optimizer is generally utilized, in accordance with embodiments of the invention.

FIG. 2 is a schematic diagram of a quantum optimizer system 100, otherwise described herein as a quantum optimizer 100. The quantum optimizer 100 may be used in parallel and/or series with one or more classical computer systems to solve optimization problems. The quantum optimizer 100 is comprised of a data extraction subsystem 104, a quantum computing subsystem 101, and an action subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the data extraction subsystem 104 communicates with the network to extract data for optimization. It will be understood that any method of communication between the data extraction subsystem 104 and the network is adequate, including but not limited to wired communication, radiofrequency (RF) communication, Bluetooth®, WiFi, and the like. The data extraction subsystem 104 then formats the data for optimization in the quantum computing subsystem.

As further depicted in FIG. 2, the quantum computing subsystem 101 comprises a quantum computing infrastructure 123, a quantum memory 122, and a quantum processor 121. The quantum computing infrastructure 123 comprises physical components for housing the quantum processor 121 and the quantum memory 122. The quantum computer infrastructure 123 further comprises a cryogenic refrigeration system to keep the quantum computing subsystem 101 at the desired operating climate. In general, the quantum processor 121 is designed to perform adiabatic quantum computation and/or quantum annealing to optimize data received from the data extraction subsystem 104. The quantum memory 122 is comprised of a plurality of qubits used for storing data during operation of the quantum computing subsystem 101. In general, qubits are any two-state quantum mechanical system. It will be understood that the quantum memory 122 may be comprised of any such two-state quantum mechanical system, such as the polarization of a single photon, the spin of an electron, and the like.

The action subsystem 102 communicates the optimized data from the quantum computing subsystem 101 over the network. It will be understood that any method of communication between the data extraction subsystem 104 and the network is adequate, including but not limited to wired communication, radiofrequency (RF) communication, Bluetooth®, WiFi, and the like.

The action subsystem 102 communicates the optimized data from the quantum computing subsystem 101 over the network. It will be understood that any method of communication between the data extraction subsystem 104 and the network is adequate, including but not limited to wired communication, radiofrequency (RF) communication, Bluetooth®, WiFi, and the like.

Figure 4:
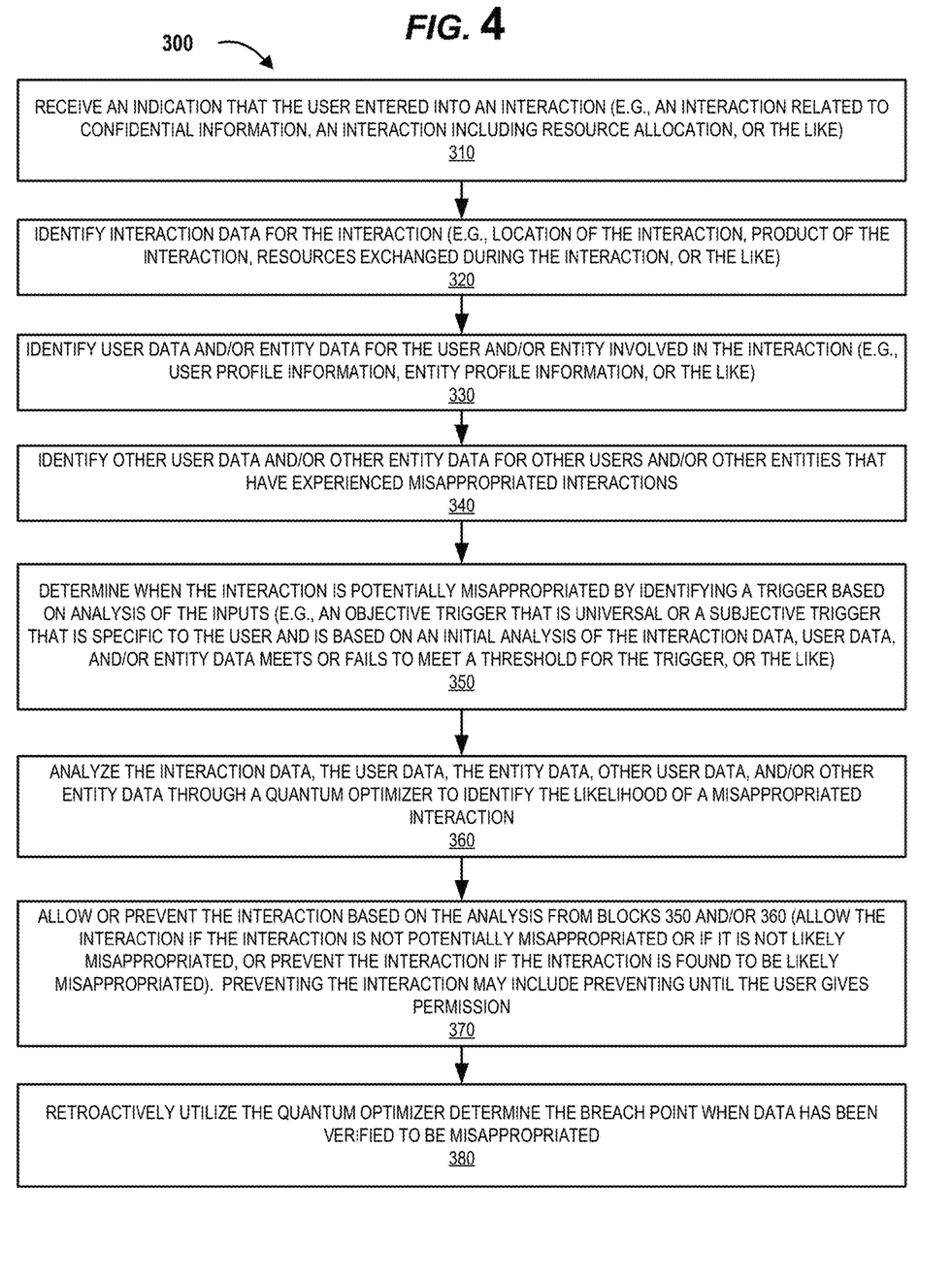
FIG. 4 illustrates a process flow regarding utilizing the quantum optimizer to determine potentially misappropriated data, in accordance with embodiments of the invention.

FIG. 4 illustrates a process flow regarding utilizing the quantum optimizer to determine potentially misappropriated data and the breach point of such potentially misappropriated data. For example, block 310 of FIG. 4 recites that the organization systems 10 receive an indication that the user 4 entered into an interaction with an entity. The interaction may be any interaction with any type of entity for which confidential data is exchanged. For example, the interaction may be an interaction for the transfer of financial data, therapeutic data, proprietary data, or the like. In one example, the interaction may include the transfer of resources (e.g., funds) associated with a resource pool (e.g., a financial account) of a user 4. As such, during the transfer of resources, confidential data related to the user and/or the user's resource pool may also be transferred between the organization systems 10 and the third-party entity systems 40. In one example, the interaction may be a purchase made by the user 4 of a product (e.g., good or service) from the entity (e.g., merchant). In this example, the process described with respect to FIG. 4 may occur before the purchase is allowed (e.g., review the interaction before determining if the interaction is acceptable and allowing or denying the transaction based on the determination), or may provisionally allow the interaction and the process may occur before the interaction is settled (e.g., before the resources are transferred). Moreover, the process may be used retroactively to determine potentially misappropriated data and/or the location of the breach of the misappropriated data (e.g., the misappropriation may have occurred within the current interaction, but the breach that resulted in the misappropriated data may have occurred during a past interaction), as described in further detail later.

As illustrated by block 320 in FIG. 4, the organization system 10 may identify interaction data for the interaction between the user 4 and the entity. For example, the organization system 10 may receive interaction data from third-party entity systems 40 (e.g., entity systems such as merchant systems for the merchant with which the user 4 entered into the interaction). Alternatively, or in addition, the organization systems 10 may receive interaction data from the user computer systems 20 (e.g., information from a mobile device application used to enter into the interaction). In some embodiments of the invention the interaction data may include a location of the entity (e.g., received from the entity, received from a location determining device in the user computer system 20); a type of interaction (e.g., transfer of resources, application of a particular resource pool, or the like); confidential data transferred during the interaction (e.g., identification number, resource pool total resources, user name, address, or the like); a resource amount (e.g., resources exchanged, such as incoming or outgoing funds); a product (e.g., the good or service purchased); the time of the interaction (e.g., time of day, specific time, or the like); or the like. This type of interaction data may be received from the third-party entity systems 40 (e.g., merchant systems, or other third-party intermediary) or from the user computer systems 20 (e.g., mobile device, or other third-party intermediary). In some embodiments, the interaction data may further include the location of the user 4 when the interaction occurred (e.g., through the use of a location determining device associated with the mobile device), which may be different than the location of the interaction (e.g., location of the merchant).

Block 330 of FIG. 4 recites that the organization systems 10 will identify user data and/or entity data for the user 4 and entity involved in the interaction. In some embodiments the user data may include user information data and user interaction history. The user information data may include the user's address, user interests, products used by the user 4, social networking information, or the like and may be based on user data stored by the organization systems 10 or received from third party entities (e.g., other organizations through which the user 4 enters into interactions, or other entities, such as social networking accounts, user resource analysis systems, or the like). The user interaction history includes past interactions that the user had previously entered into and includes the same type of data as previously discussed with respect to the user's current interaction described with respect to block 320. The entity data may include data related to if the entity has experienced misappropriated interactions, such as if the entity had interactions that were misappropriated in the past, the location of the misappropriations, how the misappropriations occurred (e.g., type of misappropriation, extent of misappropriation both in the data involved and how many users were affected). Additional entity data may include the size of the entity, the various locations of the entity, the interactions the entity has had with users 4 in the past, or the like.

FIG. 4 further illustrates in block 340 that the organization systems 10 may also access other user data or other entity data related to identifying misappropriated data that has occurred with other users and/or with the user or other users at other entities, which may help to identify if the current interaction may also be potentially misappropriated. For example, the organization systems 10 may compare the user 4 and the entity in the current interaction with the other users and/or the other entities to determine if there are any common relationships. As such, it may be determined that the user 4 in the current interaction has resource accounts with a third party entity for which other users have had interactions that have been misappropriated. In another example, the user 4 and at least one of the other users may work for the same entity, or live in the same household, and the user 4 may be subject to a higher potential misappropriation if one or more other users associated with the user 4 have had data that has been misappropriated. As such, the current system not only identifies the user 4 and entity involved in the current interaction, but may also identify related users and/or entities for which data has been misappropriated or potentially misappropriated in order to determine if there is an increased chance of misappropriation of the data of the user 4 in the current interaction.

In addition to the other entities described with respect to block 340, the other entities may include news entities, social networking entities, other organization entities (e.g., other financial institutions). The other entity data associated with the other entities may include news data, which may include publicly available data that identifies entities that have had interactions with misappropriated data. The other entity data may include social data about users or entities that can be captured form the social networking accounts of the user, other users, or other entities. For example, the organization systems 10 (or investigation systems 30) may access social networking accounts (e.g., public social networking accounts, or otherwise may receive permission to access the private social networking accounts of the other users or other entities using login information of the users or other entities) to determine interaction data and/or user data related to the user, other users, or entities. For example, the social data may include the location of the users at the particular times that the misappropriated interaction occurred, association of the user with the other users that may have been the subject of misappropriated data (e.g., the user 4 is friends with one or more other users that have had misappropriated data), the user was tagged at a particular entity with one or more other users that had data misappropriated, or the like. Other social data my include data related to the entities with which the user 4 has a relationship (e.g., user likes the entity, user is tagged at the entity location, or the like). As such the social data may be utilized by both the classical computers and quantum optimizers to determine potential misappropriated interactions and/or a breach point (e.g., likely breach point). The other entity data may be resource pools and/or interactions the user 4 may have through other organization entities (e.g. other financial accounts of the user 4 at other financial institutions, other entities that the user uses to aggregate the user's financial information). For example, the user 4 may allow the organization systems 10 and/or the investigation systems 30 to access the user's interactions through other organization systems (e.g., other financial accounts at other financial institutions).

Block 350 of FIG. 4 illustrates that a determination is made if the interaction is potentially misappropriated (e.g., confidential data is potentially compromised, resources of the user 4 have been applied without the consent of the user 4, or the like). In some instances the determination may be made by the organization systems 10. In other embodiments, the determination may be made by investigation systems 30 (e.g., owned by the organization, or by a third-party entity) that are dedicated specifically to analyzing and determining if interactions for the users 4 of the organization are potentially misappropriated (e.g., using one or more classical computers). In some instances the determination may be made if any data associated with the current interaction of the user 4 results in a trigger. The trigger occurs when one or more of the data inputs (e.g., the user data, the entity data, the other user data, the other entity data, or the like) indicates that the current interaction may be potentially misappropriated. The trigger may be an objective universal trigger that applies to all interactions regardless of the specific user 4 associated with the interactions. For example, if the current interaction is with an entity that has been known to have been compromised or has been known to be involved in misappropriated interactions, then this is a trigger that automatically indicates that the interaction is potentially misappropriated regardless of the user 4 involved in the interaction. Alternatively, the trigger is specific to the user 4 that entered into the interactions (e.g., subjective). For example, a determination may be made by analyzing the interaction data (e.g., the cost associated with the interaction, the product associated with the interaction, the geography of the transaction versus the user location or the like), the user information (e.g., the transaction history of the user to determine if the current interaction is outside the scope of the past user interactions, or the like), and the entity information (e.g., location of the entity, the entity type, history of misappropriated interactions associated with the entity, or the like) of the specific user. Based on the analysis of the one or more inputs, a classical computer may determine that a trigger is met in order to determine that the current interaction of the user 4 is potentially misappropriated. In one example, this determination may be based on a linear determination of the probability of deviation of the user from the user's normal practices based on one or more of the inputs. If the user's current interaction is within a number of standard deviations from the linear distribution then the current user interaction may not be found to be a potentially misappropriated interaction. Alternatively, if the user's interaction is outside a number of standard deviations from the linear distribution then the current user interaction may be found to be a potentially misappropriated interaction. Instead of a linear determination, the determination may be based on an integral, or may be based on a simple yes/no condition associated with an aspect of the interaction. It should be understood that due to the limitations of the processing capabilities of classical computers, this determination is based on a limited number of the inputs because the classical computers do not have the ability to analyze all of the inputs identified. As such, instead of first running the inputs through a classical computer to determine if an interactions is potentially misappropriated, the inputs may be provided directly to a quantum optimizer for a more thorough investigation.

Block 360 of FIG. 4 illustrates that when an interaction is determined to be potentially misappropriated (e.g., as described with respect to block 350) a quantum optimizer is utilized to determine if the interaction is likely misappropriated. Alternatively, the quantum optimizer may be utilized directly to analyze the inputs without having to first run the inputs through a classical computer. Either way, a quantum optimizer is utilized to analyze more of the inputs (e.g., the interaction data, user data, and/or entity data, and/or the other user data and/or other entity data) than the classical computer could analyze in order to more accurately and efficiently determine the likelihood that the potentially misappropriated interaction is likely misappropriated. While classical computers may have the ability to analyze some of the inputs, the quantum optimizer has the ability to analyze many more inputs to provide a more accurate determination of whether or not the interaction is likely misappropriated. As such, the quantum optimizer may be able to create a more accurate linear distribution, integral distribution, other robust/fast model of the user's interactions. Moreover, the quantum optimizer is a more intricate model that can provide a more accurate determination of whether or not the current interaction is potentially misappropriated (e.g., a more accurate probability, or the like). Moreover, the quantum optimizer may determine an intricate model, but then develop a simple model to approximate the intricate model that either the classical computer and/or the quantum optimizer may use in order to determine the likelihood that the interaction is misappropriated.

Block 370 of FIG. 4 illustrates that in response to block 350 and 360, the organization systems 10, the investigation systems 30, and/or the quantum optimizer systems 100 may allow or prevent the current interaction. For example, if the organization systems 10 and/or investigation systems 30 determine that the current interaction is not potentially misappropriated then the organization systems 10 and/or the investigation systems 30 allow the interaction. However, if the organization systems 10 and/or investigation systems 30 determine that the current interaction is potentially misappropriated, then the organization systems 10 and/or the investigation systems 30 sends the interaction and the inputs to the quantum optimizer. As such, the quantum optimizer systems 100 determine the likelihood that the current interaction is misappropriated, and thus, either allows the interaction if it is (or the user is) not likely misappropriated or prevents the interaction if the interaction is (or the user is) likely misappropriated. When preventing the interaction, the organization systems 10 may automatically prevent the interaction from occurring, or may automatically temporarily prevent the interaction and send a notification to the user 4 who can either reject or allow the interaction.

As illustrated by block 380, in addition to determining if a current interaction is likely misappropriated the quantum optimizer may also retroactively analyze breach data to determine the breach point (e.g., a breach time and/or breach location) when an interaction has been verified as being misappropriated. It should be understood that if an interaction is found to be misappropriated the interaction may be the breach point; however, the breach of the misappropriated data may have occurred before the interaction at which the misappropriated data was identified. For example, if the breach occurred at the time and with the entity associated with the current interaction it may be obvious to determine the circumstances surrounding the misappropriated interaction. However, in another example, the quantum optimizer systems 100 may be further utilized to analyze where the misappropriated data was originally misappropriated. As such, based on the current interaction, the quantum optimizer systems 100 may review the past user interactions in light of the newly identified current interaction that has been misappropriated in order to determine where the original breach occurred (e.g., re-review and analyze the past interactions to determine if the probability of misappropriation has increased based on the newly misappropriated data. In this way, the likelihood of the past interactions being misappropriated may have changed (e.g., changed from likely not misappropriated to likely misappropriate). Alternatively, the quantum optimizer may analyze the other data, such as the user data, entity data, other user data, other entity data, or the like (e.g., including the social networking data, the news data, the other financial institution data, or the like) in order to determine the breach time and breach location (e.g., entity associated with the breach). Additionally, the quantum optimizer may utilize breach data, such as patterns of past breaches (e.g., past breach times, entities, users involved, type of breach, or the like) in order to determine the breach time and breach location (e.g., entity at the location). As such, the quantum optimizer is utilized to identify how the breach that led to the misappropriated data during the current interaction occurred, and thus, allow the user 4 and/or organization to prevent future beaches for the user or other users and/or the notify the entity associated with the breach point.

Figure 5:
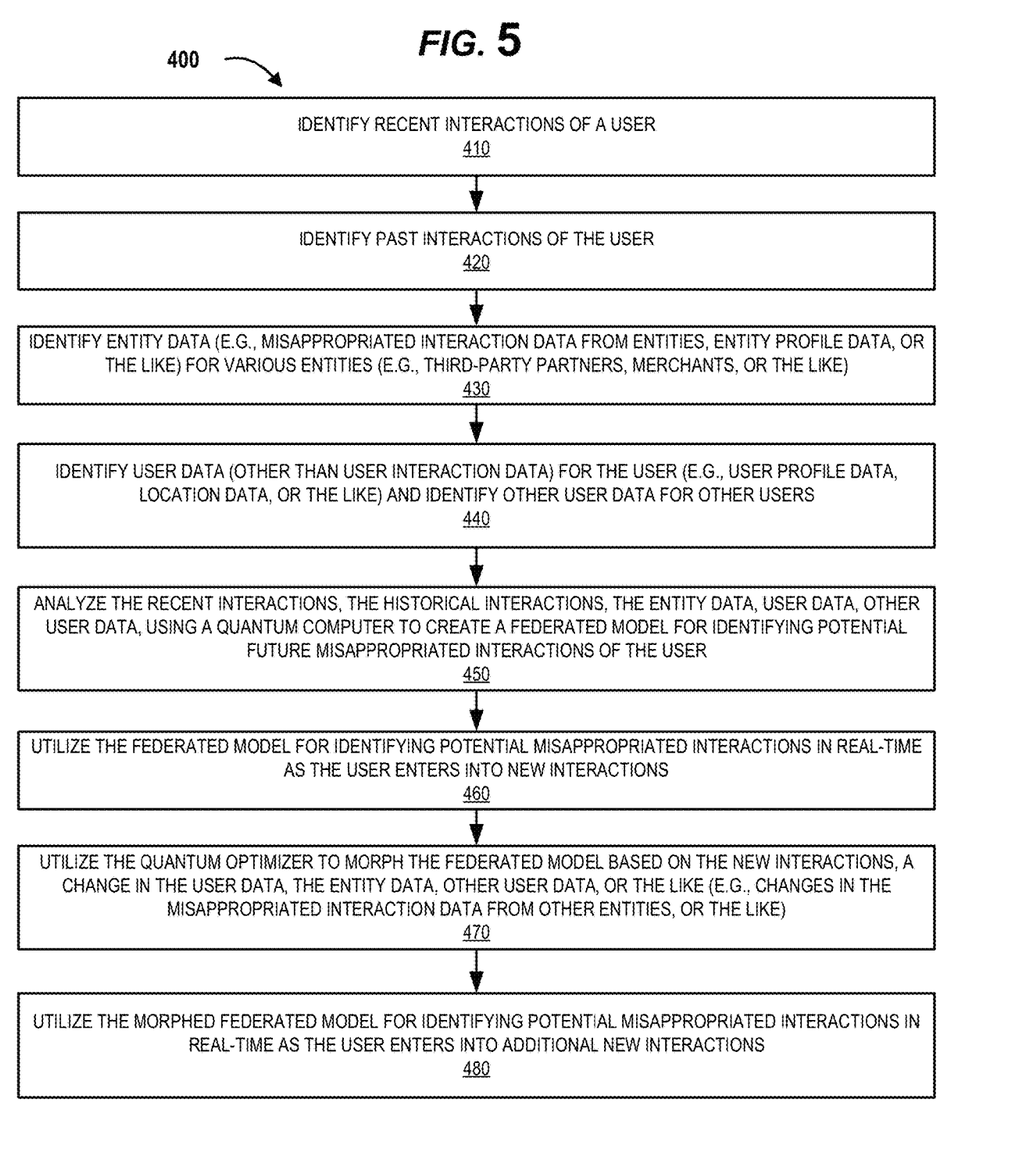
FIG. 5 illustrates a process flow regarding utilizing the quantum optimizer for a specific user in order to predict future interactions that may include potentially misappropriated data, in accordance with embodiments of the invention.

FIG. 5 illustrates a process flow regarding utilizing a quantum optimizer for a specific user 4 in order to predict future interactions that may include potentially misappropriated data. Block 410 of FIG. 5 illustrates that recent interactions of the user 4 are identified. This includes recent interactions that occurred within a recent time period (e.g., within hours, within a day, within a week, or the like). Block 420 of FIG. 5 illustrates that historical interactions of the user 4 also identified. This includes horizontal interactions that occurred within a historical time period greater than the recent time period (e.g., greater than a month, multiple months, year, or the like). The recent interactions and the historical interactions may be collectively described as past interactions. It should be further understood that the recent interactions and the historical interactions may be analyzed differently in that the recent transactions may provide more insight regarding if current and/or future interactions may be misappropriated by comparing the recent interactions to the historical interactions.

Block 430 illustrates that entity data is identified for various entities. The entity data, as previously discussed with respect to FIG. 4, may include misappropriated interaction data that has occurred with various entries. The entities may be entities with which the user 4 has entered into interactions, but the entities may also be entities that are known by the organization to have had misappropriated data breaches. Because the organization (e.g., financial institution) may have information regarding millions of interactions of millions of users on a daily basis, the organization has information regarding entities that have been misappropriated. Moreover, third-party entities (e.g., other financial institutions, such as first, second, third, fourth, or n[th], financial institutions) may share entity data with the organization (e.g., financial institutions share misappropriated data with each other, or the user allows the first financial institution to access the user's accounts with other financial institutions to retrieve interaction data, misappropriated data, entity data, or the like). Moreover, social networking accounts and/or news sources may provide additional data regarding entities that have recent misappropriated data beaches, and/or additional user data regarding the user or other users (e.g., locations data, product data, entity data, or the like). As such, the organization may have data related to entities based on the interactions in which the organization has been involved (e.g., from its own customers) and based on data received from third-party entities (e.g., shared based on customers of other organizations, from merchants, or the like).

Block 440 further illustrates that user data (user data other than the past interactions of the user) is identified for the user 4. The user data may be the user data previously described with respect to blocks 330 and 340 of FIG. 4. The user data may be data related to the user 4 as well as other users. The user data may include user information (e.g., user location, interaction preference information provided by the user, discount offers accepted by the user, or the like). The user data may be based on data to which the organization has access (e.g., user is a customer of the organization), or may be based on data that the organization can capture or receive from third party organizations (e.g., the user allows the organization to capture user data from other organizations, such as other financial institutions, offer institutions, merchants, social networking accounts, or the like). The organization may have access to other user data, such as based on other customers of the organization, and/or user data shared between organizations related to misappropriated data associated with the other users.

Block 450 illustrates that a quantum computer is utilized to analyze the inputs (e.g., the recent interactions, the past interactions, the entity data, the user data and/or other user data) to create a federated user model. As previously described herein, the quantum optimizer system 100 has the ability to analyze more inputs than a classical computer. As such, by analyzing more inputs the quantum optimizer is able to create an improved federated model for identifying potential future misappropriated interactions when compared to a model that a classical computer could develop. In particular, the quantum optimizer performs adiabatic quantum computation and/or quantum annealing using the inputs to generate an optimized federated user model that may be used to identify potential future misappropriated interactions. For example, the quantum optimizer system 100 assigns qubits to the inputs and develops a federated user model based on the inputs. In one example, the model may be developed by identifying and analyzing a model that predicts previously known misappropriated interactions. The quantum optimizer systems 100 is able to create a more intricate model that can provide a more accurate determination of whether or not the future interactions would be potentially misappropriated (e.g., a more accurate probability, or the like). In some embodiments, the federated user model may be determined by utilizing the quantum optimizer systems 100 to analyze many known models at the same time in order to determine what model provides more accurate results for predicting future misappropriated interactions (e.g., used past misappropriated interactions to determine which model would have been the best (e.g., greatest confidence) in predicting the past misappropriated interactions). Moreover, in some embodiments of the invention, after the quantum optimizer develops the intricate model using the inputs, the intricate model may be approximated by a more general model that approximates the intricate model in order to allow a classical computer to determine the likelihood that future interactions are misappropriated using the approximated general model.

In some embodiments of the invention the quantum optimizer system 100 may analyze the federated user model in order to determine if future interactions are potentially misappropriated. Alternatively, block 460 in FIG. 5 illustrates that the federated user model created using the quantum optimizer system 100 may be utilized by the classical computer systems (e.g., the organization systems 10 and/or the investigation systems 30) to determine potential misappropriated interactions in real-time as the user enters into new interactions. While the quantum optimizer may be able to analyze more data, the classical computer has better processing speeds when performing simpler tasks using less information. As such, while the quantum optimizer systems 100 develops the complex federated user model and/or identifies the most accurate federated user model (e.g., a specific model or a general model that approximates the specific model), the classical computer is faster at running individual interactions through the model. For example, as the user 4 enters into an interaction, a classical computer utilizes the federated model to analyze the interaction. If the model determines that the new interaction is likely a misappropriated interaction then the organization systems 10 and/or the investigation system 30 may prevent the interaction as previously discussed herein. However, it should be understood that in some embodiments of the invention the quantum optimizer may be utilized to run the individual new interactions through the federated model in order to determine if the new interaction is a potentially misappropriated interaction, and thereafter determine if the interaction is acceptable and allow or deny the interaction accordingly.

Block 470 in FIG. 5 illustrates that the federated user model may be morphed (e.g., modified) in real-time or periodically (e.g., one or more times a day, daily, nightly, every two or more days, weekly, every two or more weeks, monthly, every two or more months, yearly, or the like). As such, each time a new interaction is taken by the user 4 or another input is changed (e.g., a new entity is identified that has been compromised, social media information changes, or the like), the quantum optimizer may be used to include the new interaction, or new input, into the analysis to update the federated user model.

The morphed (e.g., modified) federated user model may be utilized to determine if the future interactions of the user are potentially misappropriated. Alternatively, block 480 of FIG. 5 illustrates that the classical computer continues to use the morphed (e.g., modified) federated user model to determine if additional new interactions of the user 4 are potentially misappropriated interactions.

It should be understood that based on the results of the federated model (and any morphed federated models) the organization may allow or prevent the one or more new interactions as previously described herein (e.g., with respect to block 370 in FIG. 4).

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with the reports for display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

U.S. patent application Ser. No. 15/461,644, which issued into U.S. Pat. No. 10,440,052 to Lee, entitled "Real-Time Identification of Resource Distribution Breach," is filed concurrently herewith, and is hereby incorporated by reference in its entirety.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for creating a federated user model for predicting misappropriated interactions, the system comprising:
   one or more quantum optimizers comprising:
      one or more quantum processors; and
      one or more quantum memory devices;
   wherein the one or more quantum processors are configured to:
      receive interaction data for a plurality of past interactions, user data, and entity data from a plurality of entities that have a relationship with a user, wherein the interaction data, the user data, and the entity data are inputs for the one or more quantum optimizers;
      assign qubits to the inputs;
      analyze the inputs to determine the federated user model for predicting future misappropriated interactions of the user; and
   wherein the federated user model is a simple model that approximates an intricate model developed by the one or more quantum optimizers; and
   wherein the federated user model is utilized by one or more classical computers to determine when a new interaction the user is entering is potentially misappropriated more efficiently when compared to the intricate model.

2. The system of claim 1, wherein the one or more quantum processors are configured to:
   utilize the federated user model to determine when the new interaction of the user is potentially misappropriated;
   provide an indication that the new interaction should be allowed when the federated user model indicates that the new interaction is acceptable; and
   provide an indication that the new interaction should be prevented when the federated user model indicates that the new interaction is misappropriated.

3. The system of claim 1, wherein the past interactions comprise recent interactions and historical interactions.

4. The system of claim 1, wherein the new interaction is included in the inputs as a new input, and wherein the one or more quantum optimizers are configured to modify the federated user model based on the new input.

5. The system of claim 1, wherein the inputs change and wherein the one or more quantum optimizers are configured to modify the federated user model based on a changed input.

6. The system of claim 1, wherein the federated user model is based on a model from a set of known models that provides a greatest confidence when predicting past misappropriated interactions.

7. The system of claim 1, further comprising:
   one or more classical computers comprising:
      one or more memory devices having computer readable code store thereon; and
      one or more processing devices operatively coupled to the one or more memory devices;
   wherein the one or more processing devices are configured to execute the computer readable code to:
      receive the new interaction of the user;
      utilize the federated user model for determining when the new interaction is allowable or when the new interaction should be prevented;
      allow the new interaction when the federated user model indicates that the new interaction should be allowed; and
      prevent the new interaction when the federated user model indicates that the new interaction should be prevented.

8. The system of claim 1, further comprising:
   one or more classical computers comprising:
      one or more memory devices having computer readable code store thereon; and
      one or more processing devices operatively coupled to the one or more memory devices;
   wherein the one or more processing devices are configured to execute the computer readable code to:
      identify the plurality of past interactions of the user with the plurality of entities;
      identify the interaction data for the plurality of past interactions between the user and the plurality of entities;
      identify the user data;
      identify the entity data; and
      provide the interaction data for the plurality of past interactions, the user data, and the entity data to the one or more quantum optimizers.

9. A method for creating a federated user model for predicting misappropriated interactions, the method comprising:
   receiving, by one or more quantum processors, interaction data for a plurality of past interactions, user data, and entity data from a plurality of entities that have a relationship with a user, wherein the interaction data, the user data, and the entity data are inputs for one or more quantum optimizers;
   assigning, by the one or more quantum processors, qubits to the inputs;
   analyzing, by the one or more quantum processors, the inputs to determine the federated user model for predicting future misappropriated interactions of the user; and
   wherein the federated user model is a simple model that approximates an intricate model developed by the one or more quantum optimizers; and
   wherein the federated user model is utilized by one or more classical computers to determine when a new interaction the user is entering is potentially misappropriated more efficiently when compared to the intricate model.

10. The method of claim 9, further comprising:
    utilizing, by the one or more quantum processors, the federated user model to determine when the new interaction of the user is potentially misappropriated;
    providing, by the one or more quantum processors, an indication that the new interaction should be allowed when the federated user model indicates that the new interaction is acceptable; and
    providing, by the one or more quantum processors, an indication that the new interaction should be prevented when the federated user model indicates that the new interaction is misappropriated.

11. The method of claim 9, wherein the past interactions comprise recent interactions and historical interactions.

12. The method of claim 9, wherein the new interaction is included in the inputs as a new input, and wherein the one or more quantum optimizers are configured to modify the federated user model based on the new input.

13. The method of claim 9, wherein the inputs change and wherein the one or more quantum optimizers are configured to modify the federated user model based on a changed input.

14. The method of claim 9, wherein the federated user model is based on a model from a set of known models that provides a greatest confidence when predicting past misappropriated interactions.

15. The method of claim 9, further comprising: receiving, by the one or more classical computers, the new interaction of the user; utilizing the federated user model for determining when the new interaction is allowable or when the new interaction should be prevented; allowing the new interaction when the federated user model indicates that the new interaction should be allowed; and preventing the new interaction when the federated user model indicates that the new interaction should be prevented.

16. The method of claim 9, further comprising: identifying the plurality of past interactions of the user with the plurality of entities; identifying; the interaction data for the plurality of past interactions between the user and the plurality of entities; identifying the user data; identifying the entity data; and providing the interaction data for the plurality of past interactions, the user data, and the entity data to the one or more quantum optimizers.

17. A computer program product for creating a federated user model for predicting future misappropriated interactions, the computer program product comprising at least one non-transitory computer-readable medium having computer-readable program code portions embodied therein, the computer-readable program code portions comprising:
   an executable portion configured to provide interaction data for a plurality of past interactions, user data, and entity data from a plurality of entities that have a relationship with a user, wherein the interaction data, the user data, and the entity data are inputs for one or more quantum optimizers;
   an executable portion configured to receive an indication that a new interaction the user is entering is potentially misappropriated based on the federated user model; and
   wherein the federated user model is determined by the one or more quantum optimizers assigning qubits to the inputs and analyzing the inputs to determine the federated user model;
   wherein the federated user model is a simple model that approximates an intricate model developed by the one or more quantum optimizers; and
   wherein the federated user model is used for predicting when future interactions of the user are potentially misappropriated more efficiently when compared to the intricate model.

18. The computer program product of claim 17, the computer-readable program code portions further comprise:
   an executable portion configured to receive an indication from the one or more quantum optimizers that the new interaction should be allowed when the federated user model indicates that the new interaction is acceptable;
   an executable portion configured to receive an indication from the one or more quantum optimizers that the new interaction should be prevented when the federated user model indicates that the new interaction is misappropriated; and
   wherein the federated user model is utilized to determine when the new interaction of the user is potentially misappropriated.

* * * * *